M. SNOW.
Cultivator.
No. 27,659.
Patented Mar. 27, 1860.
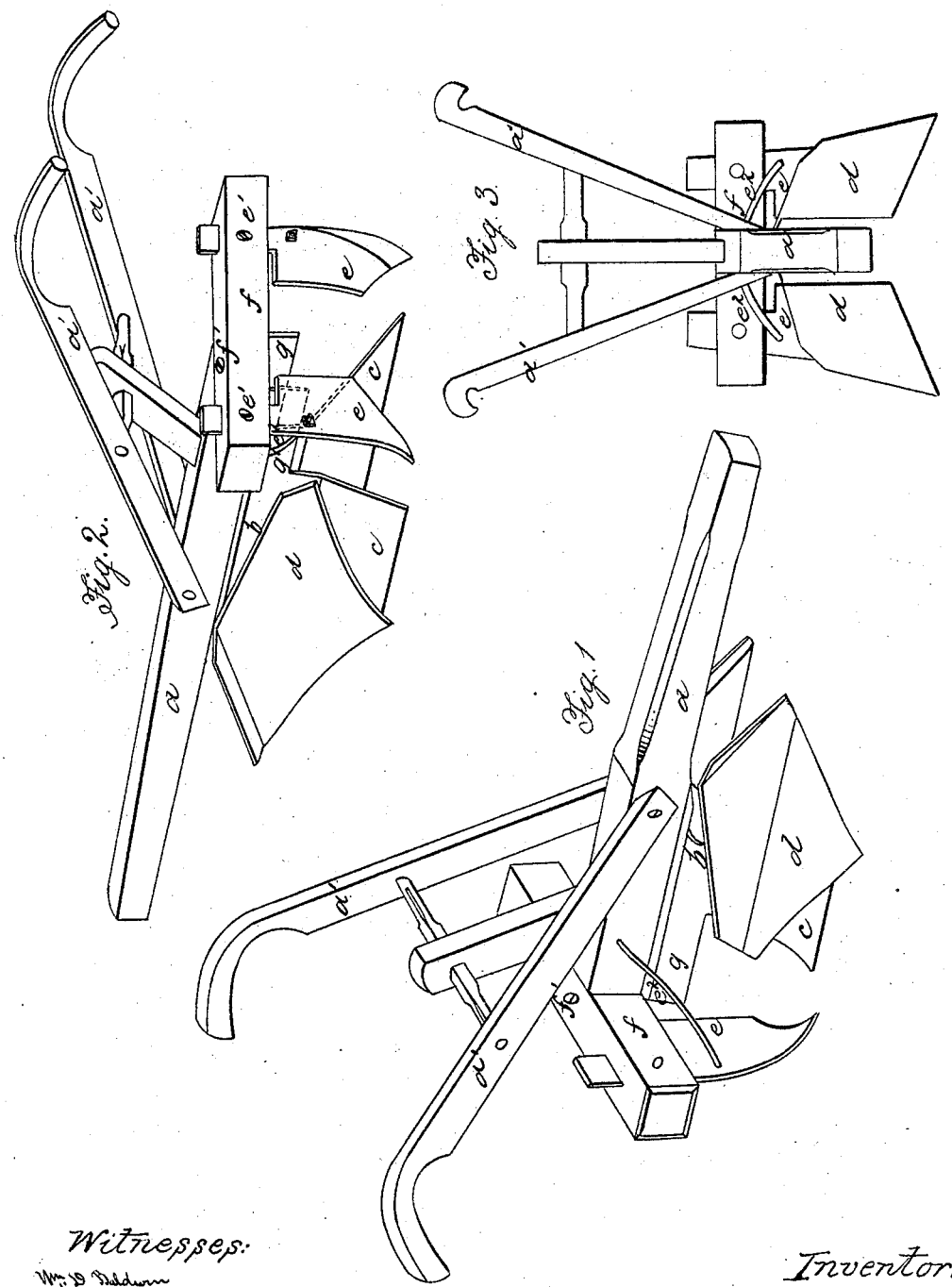

UNITED STATES PATENT OFFICE.

MARK SNOW, OF AUBURN, MISSISSIPPI.

IMPROVEMENT IN COTTON-CULTIVATORS.

Specification forming part of Letters Patent No. 27,659, dated March 27, 1860.

*To all whom it may concern:*

Be it known that I, MARK SNOW, of Auburn, in the county of Hines and State of Mississippi, have invented a certain new and useful Improvement in Cotton-Cultivators, of which the following is a full, clear, and exact description, reference being had to the accompanying drawings, which make part of this specification, and in which—

Figure 1 represents, in perspective, my improved cultivator as it would appear to a person in front and on one side thereof. Fig. 2 represents a similar view of the same as it would appear to a person in rear and on one side thereof; and Fig. 3 represents a view of the front of the same, showing the general arrangement of the parts by means of which both sides of a row may be cultivated at once without injury to the plants.

My invention relates to that class of cotton-cultivators in which both sides of the row or ridge may be cultivated at once; and it has for its object the scraping and hilling of the ridge at one and the same operation without injury to the plants, whereby the planter is enabled to save much time, labor, and expense in the cultivation of his crop. To accomplish these objects I attach two scraping mold-boards to the front part of the body of the plow, in such manner that one shall travel on each side of the row to scrape the ridge and throw the scrapings into the center of the furrow, where they will be covered by the earth thrown upon them by the rear parts of the scraping mold-boards, which are so arranged as to cut deeper than the front edges. These mold-boards are placed a sufficient distance apart to permit them to pass on each side of the row without touching the plants. Two hilling mold-boards are secured to the rear of the frame, and are so arranged as to cut deeper than the scraping mold-boards and to throw the earth inward upon the plants after the ridge has been scraped. Shield-plates or fenders are secured to the rear end of the plow-beam and project downward on each side of the row. These fenders are interposed between the plants and the hilling mold-boards, to prevent too much earth being thrown upon the top of the ridge. Wings are placed at the back of the scraping mold-boards and inclined at an angle suitable to the inclination of the ridge, in order that the cultivator may run steadily and keep its proper course without the constant exercise of the care and strength of the plowman.

In the accompanying drawings the various parts of the cultivator are represented as secured to the beam $a$, to which handles $a'$ are applied, both being of the ordinary construction. The standards $b$ project downward from the beam at such distance apart as may be deemed most convenient. Inclined wings $c$ are secured to the bottoms of these standards, just back of the scraping mold-boards, for the purpose of rendering the plow steady.

The two scraping mold-boards $d$ are secured to the front of the standards $b$ at such an angle that while the beam is horizontal the front edges of the plowshares shall be parallel to the surface of the ridge. These scraping mold-boards are of a peculiar shape, as shown in the drawings, and are set in such manner that that part of the edge which first comes into action, or that which works next the row, makes a shallower cut than that which acts upon the center of the furrow.

The hilling mold-boards $e$ are secured to a cross-beam, $f$, attached to the rear of the beam $a$ and projecting at right angles therefrom. They are set to cut at a greater depth than the scraping mold-boards, and are arranged in such manner as to throw the earth inward upon the plants. They may be made of any of the suitable and well-known forms familiar to those skilled in the art of constructing plows. The mold-boards $e$ may be held in place in the beam $f$ by means of set-screws $e'$, and may likewise be rendered adjustable by being provided with a series of holes into which the screws may take. They may also be braced by means of a tie-rod, $e^2$, extending from the beam $a$ to each mold-board, having a nut and screw on its ends to permit of the adjustment of the plows.

Fenders $g$, extending downward from the beam, are interposed between the hilling mold-boards $e$ and the plants, in order to prevent them from being covered too deeply with earth. These fenders are represented as forming part of the standards of the cultivator, but may be made separate, if preferred. They may likewise be made adjustable both as to their height above the ground and their distance apart, and the same may be done with the other parts of the cultivator.

The operation of the machine is as follows:

The cultivator is intended to be drawn by two or more horses harnessed to a double-tree secured to the clevis, so that the horses may walk in the furrow while the cultivator runs on the ridge, and thus avoid injury to the plants. The machine is guided by the plowman in such manner that the beam $a$ shall run just above but not touch the tops of the plants. As the machine is drawn along the front edges of the mold-boards $d$ scrape the sides of the ridge and throw the weeds into the center of the furrow, where they are covered by the earth thrown upon them by the lower edges of the same mold-boards. The hilling mold-boards $e$ then come into action and scoop up the earth from near the center of the furrow and throw it inward upon the plants, which are prevented from being covered too deeply by the fenders $g$. Thus by the use of my improved cultivator the labor of the hand and team is greatly economized at that season of the year when the planter is most pressed with work, and a better stand of cotton is obtained from the perfect protection my cultivator secures to the top of the ridge.

A more detailed description of the various parts of my machine is deemed unnecessary here, as they severally form no part of the subject-matter herein claimed, and are, besides, well known to all those skilled in the construction of agricultural implements.

Having thus described my improved cotton-cultivator, what I claim therein as new, and desire to secure by Letters Patent, is—

The combination of the scraping mold-boards $d$, hilling mold-boards $e$, and fenders $g$, when arranged and operating substantially as herein described.

In testimony whereof I have hereunto subscribed my name.

M. SNOW.

Witnesses:
WM. D. BALDWIN,
HENRY BALDWIN, Jr.